United States Patent
Leibowitz

[11] 3,957,352
[45] May 18, 1976

[54] ELECTROCHROMIC DISPLAY HAVING IMPROVED ELECTROLYTE

[75] Inventor: Marshall Leibowitz, Englewood, N.J.

[73] Assignee: Timex Corporation, Waterbury, Conn.

[22] Filed: Sept. 2, 1975

[21] Appl. No.: 609,256

[52] U.S. Cl. ............................................. 350/160 R
[51] Int. Cl.² ........................................... G02B 5/23
[58] Field of Search ................... 350/160, 311, 312; 340/336

[56] References Cited
UNITED STATES PATENTS
| | | | |
|---|---|---|---|
| 3,451,741 | 6/1969 | Manos | 350/160 R |
| 3,708,220 | 1/1973 | Meyers et al. | 350/160 R |

*Primary Examiner*—Alfred E. Smith
*Assistant Examiner*—D. C. Nelms

[57] ABSTRACT

An electrochromic display device having transparent front electrodes on a substrate, said front electrodes being coated with electrochromic material having different oxidation states for displaying optical patterns, a back electrode on a parallel substrate also coated with electrochromic material, a thin porous separator between the substrates, a liquid electrolyte contacting the electrochromic layers, said electrolyte being saturated with electrochromic materials in each of the oxidation states to reduce the degradation of the electrochromic layers as they pass through each of the oxidation states. The saturating materials are tungsten trioxide, hydrogen tungsten oxide, and tungsten dioxide in the electrochromic display described.

9 Claims, 2 Drawing Figures

ELECTROCHROMIC DISPLAY HAVING IMPROVED ELECTROLYTE

BACKGROUND OF THE INVENTION

This invention relates to electrochromic displays and particularly to an electrochromic display having an improved electrolyte.

The prior art discloses various electrochromic materials which may exist in more than one oxide state and which each exhibit different optical properties. Typical examples are set forth in U.S. Pat. No. 2,319,765 to Talmey which issued May 18, 1943 and U.S. Pat. No. 3,521,941 to Deb et al. which issued July 28, 1970.

The use of electrochromic materials in various electrooptical displays is revealed in Jones U.S. Pat. No. 3,283,656 issued Nov. 8, 1966 and Beegle U.S. Pat. No. 3,704,057 issued Nov. 28, 1972.

The Jones patent discloses a coloring material as the electrolyte while the Beegle patent discloses a gelled electrolyte. Also of interest in this area of electrooptical displays are U.S. Pat. No. 3,451,741 to Manos issued June 24, 1969 and U.S. Pat. No. 3,807,832 to Castellion, issued May 18, 1971.

Further patents of interest include U.S. Pat. Nos. 3,827,784 and 3,840,287. U.S. Pat. No. 3,827,784 to R. D. Giglia et al. which issued Aug. 6, 1974 discloses an electrochromic device including an improved bonded graphite counter electrode which is deposited from a sample solution or suspension under ambient conditions.

U.S. Pat. No. 3,840,287 to Witzke et al. which issued Oct. 8, 1974 describes an electrochromic cell having a color promoting agent located between first and second layers of electrochromic material and provides an unbalanced arrangement wherein one of the electrochromic layers is initially in its colored state so that current can readily flow through the colored layer.

The pending application Ser. No. 540,481 of M. Leibowitz filed Jan. 13, 1975 which is assigned to the assignee of record of this application relates to an electrochromic display wherein a liquid electrolyte is used for ion transfer between spaced electrochromic layers. The present invention relates to a display of this general type having an improved electrolyte and the method of making said display. In the case where a particular oxide state of the electrochromic material is soluble in the electrolyte, there will be degradation of the electrochromic layers with time and temperature. The degree of solubility may differ with each oxidation state through which the electrochromic material passes. It would be desirable to provide an improved electrolyte which reduces the degradation of the more soluble oxidation states of the electrochromic layers and hence improves the life and visiblity of the overall display.

U.S. Pat. No. 3,819,252 issued June 25, 1974 to Giglia discusses electrochromic devices wherein a conductive electrolyte is saturated with the same compounds as those used in the imaging layer, alleged to result in faster switching time. However, the additive compounds suggested do not correspond with those associated with the greatest degradation of the image layers.

SUMMARY OF THE INVENTION

The present invention pertains to an improved electrolyte for electrochromic displays and the method of producing said electrolyte and display. The invention comprises an improvement over the electrochromic display of the type disclosed in the pending application Ser. No. 540,481 mentioned above, wherein the electrolyte in the improved display is saturated by adding an excess of electrochromic material in at least two of its various oxidation states, preferably the most soluble states to the electrolyte. In one example three different materials, representing three different states in which the electrochromic material may exist during operation of the display, i.e., tungsten dioxide, tungsten trioxide, and hydrogen tungsten oxide are all added to the electrolyte. The saturating process comprises heating the foregoing mixture above the expected operating temperature of the display, for example on the order of 70°C, adding the materials, and then allowing the electrolyte mixture to cool down. After cooling, the saturated electrolyte is used to fill the electrochromic display. Preferably a porous separator is also employed in the display to prevent migration of electrically conductive material.

Accordingly, an object of this invention is to provide a new and improved electrooptical display and the method of making said display.

Another object of this invention is to reduce the degradation of the electrochromic layers in an electrochromic display by providing an improved electrolyte.

A more specific object of this invention is to provide a new and improved electrochromic display having an improved electrolyte which compensates for the solubility of the more soluble oxide states of electrochromic layers in the electrolyte thereby prolonging the life of the display.

BRIEF DESCRIPTION OF THE DRAWINGS

Other objects and advantages may be seen from the following description when viewed in conjunction with the accompanying drawings wherein.

DETAILED DESCRIPTION OF THE INVENTION

Figure 1:
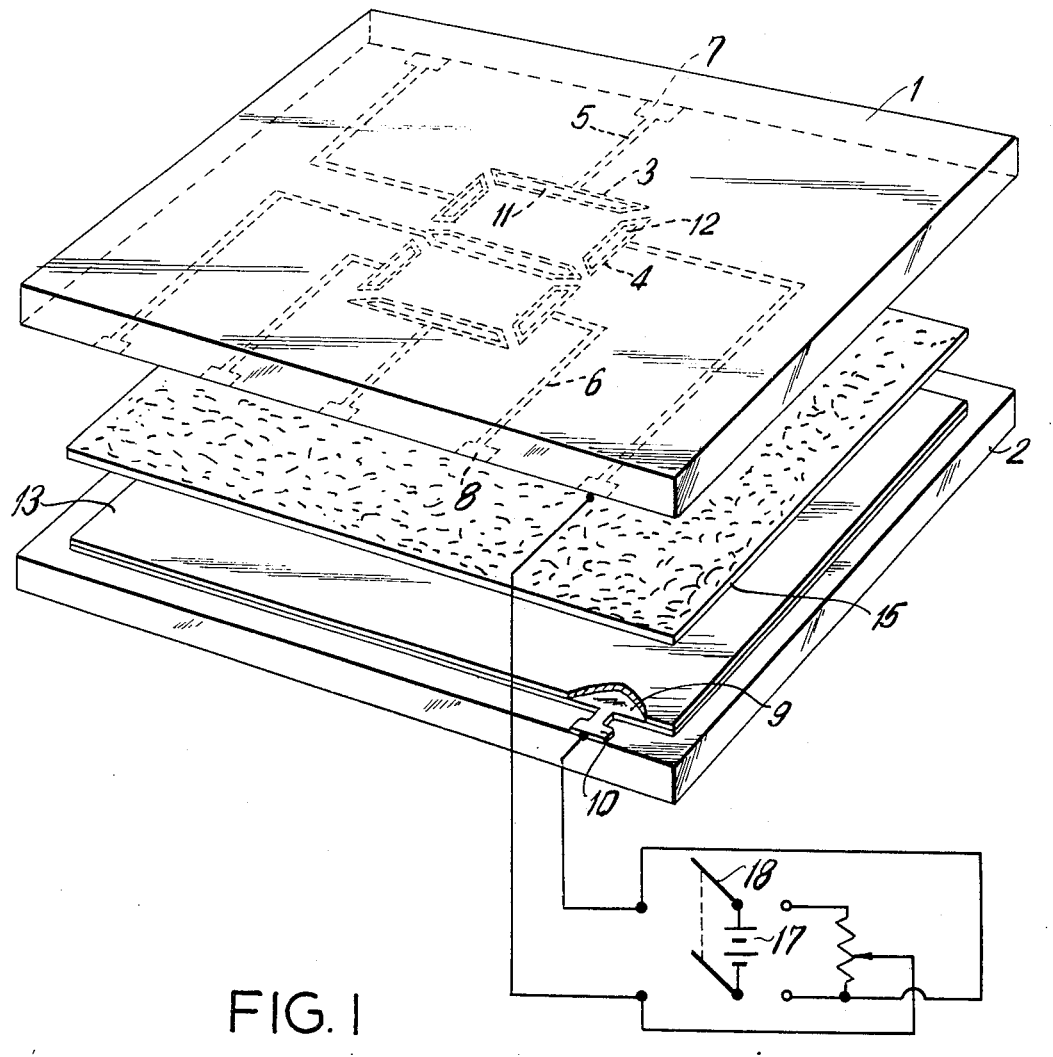
FIG. 1 is an exploded perspective view of a typical electrochromic display incorporating the present invention, and, FIG. 2 is an enlarged cross sectional view taken through an assembled display for the type shown in FIG. 1.

Referring now to FIG. 1 of the drawings, the electrochromic display is a sandwich construction of a first transparent substrate 1 and a second spaced substrate 2, which need not be transparent and a separator 15 therebetween. Substrate 1 has a conductive pattern of transparent electrodes on the underside thereof such as segments 3, 4 of a pattern which can be selectively actuated to form digits or other opticial patterns via conductive leads 5, 6 leading to terminals 7, 8. Substrate 1 may be of transparent glass or plastic with a selected pattern of transparent electrodes 3, 4 thereon of a material such as tin oxide. The pattern may be etched on the substrate by using a commercially available material known as NESA glass and removing the conductive coating except for electrodes 3, 4.

The second substrate 2 has a conductive back electrode 9 thereon. Substrate 2 may be of glass, ceramic or plastic, coated with a suitable conductive layer to form back electrode 9 connected to terminal 10.

Coated on the transparent electrode segments 3, 4 and also on the back electrode 9 are layers of electrochromic material indicated as 11, 12, 13. The electrochromic layers 11, 12 on segments 3, 4 respectively are applied by suitable masking techniques to cover a smaller area than the electrodes so as to give good edge definition.

The separator 15 may be a porous separator as disclosed in the pending application Ser. No. 540,481 of a material such as porous polypropylene. Pigment means may be premixed in with the porous separator material to provide contrast for the electrochromic layers 11, 12 and for hiding layer 13. One suitable pigment material is titanium oxide which is white in color and provides the desired contrast with the upper layers 11, 12 of electrochromic material and also hides the back electrode layer 13 beneath the pigmented separator means 15. The separator 15 serves other important functions, that of a spacer to provide very close uniform spacing between substrates 1, 2 and secondly, that of a carrier for the liquid electrolyte, obviating the need for gelling substrates. In the present invention it also serves to isolate and prevent migration of any conductive particles which might come out of solution and cause electrical shorts between the front and back electrodes.

Many electrochromic materials exist which change color according to the oxide state. These materials are well known in the art and to a great extent are disclosed in the patents cited in the discussion of the prior art. The preferred electrochromic material used in the present invention for the electrode layers is an oxide of tungsten such as tungsten trioxide. The tungsten trioxide is deposited by vacuum evaporation or some other suitable process on the electrode segments 3, 4 and the black electrode 9.

In the process of changing color the electrochromic material passes through various intermediate valence states or oxide states where it can exist as non-stoichiometric compounds with intermediate valence states. In the present case, it passes in turn from tungsten trioxide, through various non-stoichiometric valence states of tungsten oxide (also known as hydrogen tungsten oxide) and may approach a state very close to tungsten dioxide and then back again. Each of these compounds has different optical, electrical and solubility properties. For example, the tungsten dioxide is the most soluble state; the non-stoichiometric tungsten oxides are the most electrically conductive states; and the tungsten trioxide is the most transparent but the least conductive and least soluble state, and so forth.

Figure 2:
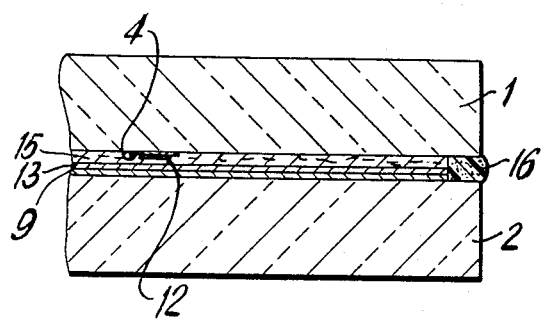

Reference to FIG. 2 of the drawing shows the assembled display. The two substrates 1, 2 are attached to one another by an adhesive 16, such as epoxy, the display filled with electrolyte and then sealed with adhesive around the remaining sides. The preferred electrolyte is dilute sulfuric acid saturated with one or more materials in accordance with the process to be described. However, the other suitable electrolytes are tungstosilicic acid or phosphoric acid.

Suitable well-known means for actuating the display elements include means for applying an electric field from a battery 17 to a selected segment 4 via a terminal 8 and the back electrode 9 via a terminal 10. Means for reversing the polarity of the applied voltage to erase the image is indicated symbolically by a two-pole double-throw switch 18.

In accordance with the present invention, the electrolyte is saturated at a temperature above its expected operating temperature with electrochromic material in at least two of its various oxide states, preferably the most soluble states, and in the preferred case, in several or all of its oxide states. This will prevent degradation with time and temperature of the electrochromic material deposited on the electrodes as it passes through various states in operation at normal temperatures.

EXAMPLE

A typical method of preparing the saturated electrolyte is as follows:

To 100 milliliters of dilute sulfuric acid is added 1 gram or more of tungsten dioxide, 1 gram or more of tungsten trioxide, and 1 gram or more of hydrogen tungsten oxide. The slurry thus formed is heated with constant stirring for several hours at 70°C or more and then allowed to cool down. The saturated electrolyte thus formed is then used to fill the electrochromic display.

The tungsten dioxide and tungsten trioxide powders are obtained from commercial sources. The hydrogen tungsten oxide is prepared by either passing hydrogen gas across tungsten oxide or by placing tungsten oxide in contact with a metal powder such as zinc under a dilute acid solution, and filtering and drying the hydrogen tungsten oxide thus formed.

The resultant display is thus similar in construction to prior art displays but includes a unique saturated electrolyte. The saturated electrolyte minimizes or substantially eliminates the solubility of all of the various oxidation states of the electrochromic material therein. This factor prolongs display life and improves display visibility and performance.

While the invention has been explained by a detailed description of specific embodiments, it is understood that various modifications and substitutions can be made in any of them within the scope of the appended claims which are intended to include equivalents of such embodiments.

I claim:

1. In an electrochromic display of the type having first and second parallel spaced substrates with selectively actuable spaced electrodes thereon, at least some of said electrodes having electrochromic layers thereon which may exist in different oxidation states, said states having different optical, electrical, and solubility properties, and porous separator means between the first and second substrates, the improvement comprising:
    an electrolyte saturated at expected operating temperature with at least two of the more soluble states of said electrochromic material, so as to reduce the degradation of the electrochromic layers of the display.

2. The display according to claim 1, wherein said electrochromic layers are selected to undergo transition into states of at least tungsten trioxide and hydrogen tungsten oxide.

3. The combination according to claim 2, wherein the electrolyte is saturated with tungsten dioxide, and hydrogen tungsten oxide.

4. The combination according to claim 2, wherein the electrolyte is saturated with tungsten dioxide, hydrogen tungsten oxide, and tungsten trioxide.

5. The combination according to claim 2, wherein the electrolyte is a mixture of dilute sulphuric acid and titanium dioxide.

6. The combination according to claim 5, wherein the electrolyte is saturated with tungsten dioxide, hydrogen tungsten oxide, and tungsten trioxide.

7. The method of making an electrochromic display of the type having first and second spaced substrates with spaced electrodes having electrochromic layers thereon which may exist in different oxide states and an electrolyte in which at least one of said states is soluble, comprising:

adding an excess of at least two soluble states of the same electrochromic material to the electrolyte, heating said electrolyte above the expected operating range of said display to dissolve an excess of said material therein, permitting said electrolyte to cool down to an ambient temperature to produce a saturated electrolyte, and, filling the space between said substrates with said saturated electrolyte during assembly of the display, in order to reduce degradation of the electrochromic layers with time and temperature.

8. A method in accordance with claim 7 wherein:
one added state of electrochromic material comprises tungsten dioxide and wherein the electrolyte is heated to a temperature on the order of 70°C.

9. The method in accordance with claim 7 wherein:
an excess of tungsten trioxide, hydrogen tungsten oxide, and tungsten dioxide are added to an electrolyte of dilute sulphuric acid and are heated to a temperature on the order of 70°C.

* * * * *